United States Patent [19]
Smith

[11] Patent Number: 6,032,523
[45] Date of Patent: Mar. 7, 2000

[54] GOLF WIND SOCK ASSEMBLY

[76] Inventor: Randolph A. Smith, 241 S. 14th St., Haines City, Fla. 33844

[21] Appl. No.: 09/130,362

[22] Filed: Aug. 6, 1998

[51] Int. Cl.[7] ........................................................ G01F 1/00
[52] U.S. Cl. ........................................................ 73/170.07
[58] Field of Search ........................... 73/170.02, 170.05, 73/170.07, 170.08; 116/264, 273, 274

[56] References Cited

U.S. PATENT DOCUMENTS

| | | | |
|---|---|---|---|
| 2,617,298 | 11/1952 | Grinley | 73/170.07 |
| 3,691,829 | 9/1972 | Perry | 73/170.08 X |
| 4,558,862 | 12/1985 | Kelly | 116/173 X |
| 4,561,301 | 12/1985 | Steele | 73/188 |
| 4,719,798 | 1/1988 | Orkin | 73/189 |
| 4,854,579 | 8/1989 | Baxter | 73/170.07 X |
| 4,864,854 | 9/1989 | vanLeemput | 73/189 |
| 5,065,622 | 11/1991 | Veenstra | 73/188 |
| 5,540,181 | 7/1996 | Pearce | 116/173 |
| 5,595,137 | 1/1997 | Delmonte | 116/264 |
| 5,734,102 | 3/1998 | Stevens | 73/170.05 |

*Primary Examiner*—Richard Chilcot
*Assistant Examiner*—Jewel V. Thompson
*Attorney, Agent, or Firm*—Joseph N. Breaux

[57] ABSTRACT

A golf wind sock assembly comprising a structure for visually indicating wind direction. A facility is for supporting the visually indicating wind direction structure in an elevated three hundred and sixty degree rotatable position, so that a person can see what direction wind is blowing from.

12 Claims, 2 Drawing Sheets

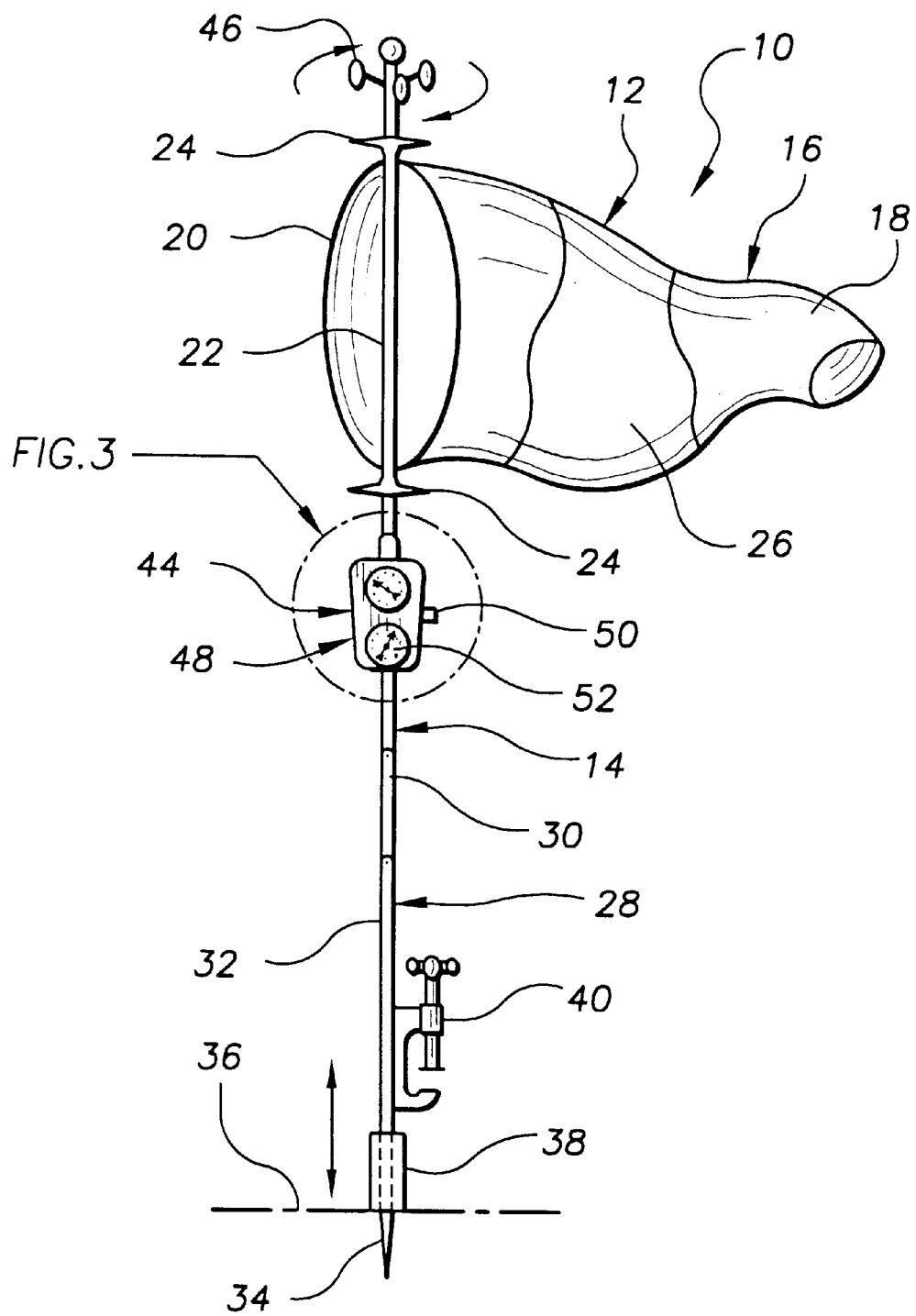

GOLF WIND SOCK ASSEMBLY

TECHNICAL FIELD

The present invention relates to wind direction indicators and more particularly to a golf wind sock assembly. The golf wind sock assembly is a wind direction and speed indicator. The golf wind sock assembly is a portable item which can be clamped onto a golf cart or carried with a set of golf clubs and inserted by a stake at a lower end into the ground, for determining wind direction and wind speed while golfing.

BACKGROUND ART

Numerous wind direction indicators have been provided in prior art. For example, U.S. Pat. No. 4,561,301 to Steele; U.S. Pat. No. 4,719,798 to Orkin; U.S. Pat. No. 4,864,854 to VanLeemput; U.S. Pat. No. 5,065,622 to Veenstra; U.S. Pat. No. 5,540,181 to Pearce and U.S. Pat. No. 5,595,137 to Delmonte all are illustrative of such prior art. While these units may be suitable for the particular purpose to which they address, they would not be as suitable for the purposes of the present invention as heretofore described.

The Steele U.S. Pat. No. 4,561,301 discloses a miniature wind sock assembly. The miniature wind sock assembly is adapted to be coiled and inserted into a small plastic display container. The wind sock is supported on a spring mast in turn fixed to a spring base bracket that is designed to be attached either to standard bicycle handlebars or to standard adjustable headband hats.

The Orkin U.S. Pat. No. 4,719,798 discloses a wind direction finder for a golf cart. The wind direction finder for use on a golf course includes a fastener portion and a ribbon portion which is attached to the fastener portion. The fastener portion includes an adhesive material having a peel away sheet, which when removed, allows the wind direction finder to be attached to the canopy frame post of a golf cart, preferably on the portion at an angle away from a line perpendicular to the ground. As the wind freely blows between the main body of the golf cart and the canopy, the wind lifts the free end of the ribbon, and the angle and direction of the ribbon can be observed by the golfer to indicate both the direction and speed of the wind. With this knowledge, the golfer can make appropriate compensations in the golf shot to be made. The fastener portion includes an interior member having the adhesive on one side thereof and a backing member and the ribbon is affixed between the interior member and the backing member. Identifying or advertising information may be printed on the side of the backing remote from the attached ribbon.

The VanLeemput U.S. Pat. No. 4,864,854 discloses a golfer's wind indicator and club selection assistance device. The device is for measuring wind direction and velocity and for instantaneously providing the golfer with an indication of the proper golf club to select under the measured wind conditions. The device comprises a means for indicating wind direction relative to the desired line of flight of the golf ball. Additionally, the device comprises a means for measuring wind velocity and is provided with precalibrated indicia relating the measured wind velocity to the number of numerical club designations by which the golfer should increase or decrease the club number which would normally be selected under windless conditions.

The Veenstra U.S. Pat. No. discloses a wind direction indicator. This wind direction indicator includes a pointing beam having a tail at one end formed by diverging feature segments, with a transverse hole in the central portion of the beam receiving a standard straight pin. A glass bead is interposed between the head of the pin and the underside of the beam, the upper extremity of the pin being attached to a standard alligator clip for attachment to a convenient twig. The hole receiving the pin is sufficiently larger than the pin to permit considerable rocking movement about a horizontal axis, and the beam is balanced after the assembly of the feathers by clipping the upwind end of the beam. This end is later finished by a short dip in a fluorescent paint, the rest of the device being finished either black or with a camouflage pattern.

The Pearce U.S. Pat. No. 5,540,181 discloses a golf wind indicator apparatus. A flag is for indicating wind velocity and alerting surrounding golfers to a presence of an individual. The inventive device includes a mounting assembly for securing to a support portion of a golf cart or golf bag. A flag assembly projects from the mounting assembly and includes a pivotally mounted flag for indicating wind direction. A gauge assembly is interposed between the flag assembly and the mounting assembly for indicating a velocity of the wind.

The Delmonte U.S. Pat. No. 5,595,137 discloses a wind indicator. The wind detector contains a freely movable main section that has wings which will respond to a wind current. The detector is small and lightweight, so that it will fit into the pocket of a hunter. In addition to having an ability to show wind direction, the detector has a scent container that contains a scent which will mask the hunter's scent and emit a scent attractive to a hunted animal.

GENERAL SUMMARY DISCUSSION OF INVENTION

The golf wind sock assembly consists of a wind sock unit mounted atop a telescoping pole having a clamp and a stake at a lower end. The stake has a spring loaded cover for safety. The wind sock unit is able to freely rotate through three hundred and sixty degrees as the direction of the wind changes. The pole can be easily carried in a golf bag with clubs and then be either attached by the clamp to a golf cart or the stake inserted into the ground from which the golf ball will be hit. A rotating wind speed cup wheel mounted on the top of the wind sock unit is connected to a battery powered wind speed indicator on the pole. The battery powered wind speed indicator has a compass to indicate direction the wind sock unit is pointing to.

A primary object of the present invention is to provide a golf wind sock assembly that will overcome the shortcomings of the prior art devices.

Another object is to provide a golf wind sock assembly that will give accurate up-to-date information at all times for wind speed and wind direction on a golf course.

An additional object is to provide a golf wind sock assembly that can be quickly mounted onto a golf cart by a clamp or inserted by a stake at a lower end into the ground.

A still additional object is to provide a golf wind sock assembly that will contain a small portable revolving wind sock unit on a telescopic pole with a battery powered wind speed indicator and compass.

A further object is to provide a golf wind sock assembly that is simple and easy to use.

A still further object is to provide a golf wind sock assembly that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is an enlarged elevational view showing the stake of the upright pole inserted into the ground.

Similar reference characters denote corresponding features consistently throughout the attached drawings.

EXEMPLARY MODE FOR CARRYING OUT THE INVENTION

Figure 1:
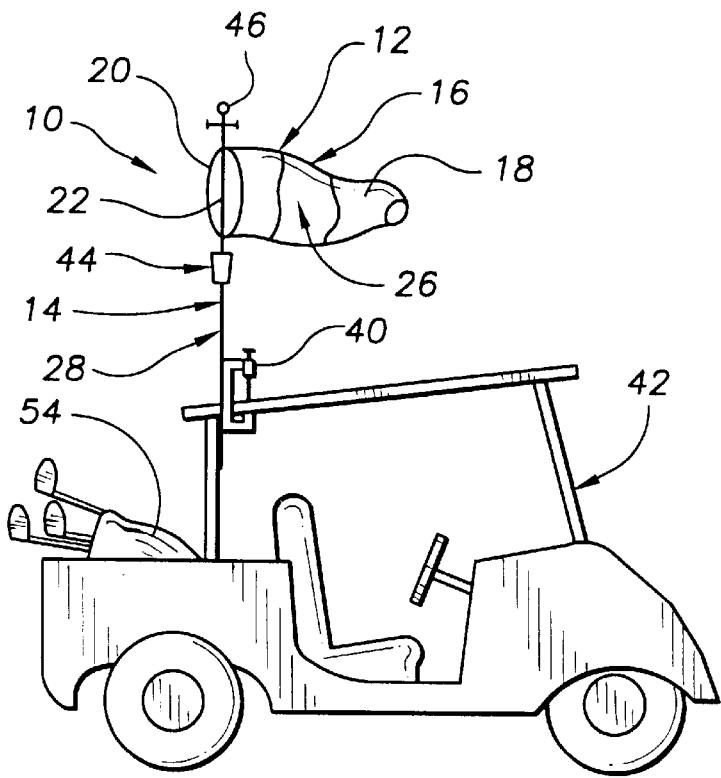
FIG. 1 is an elevational view of the present invention mounted to a golf cart.

Turning now descriptively to the drawings, in which similar reference characters denote similar elements throughout the several views, FIGS. 1 and 2 illustrate the various features of the present invention being a golf wind sock assembly 10, comprising a structure 12 for visually indicating wind direction. A facility 14 is for supporting the visually indicating wind direction structure 12 in an elevated three hundred and sixty degree rotatable position, so that a person can see what direction wind is blowing from.

Visually indicating wind direction structure 12 is a wind sock unit 16. Wind sock unit 16 includes a frusto-conical sleeve 18 mounted at a right angle through its large opening 20 upon a shaft 22 between two O-rings 24. Shaft 22 is affixed upon top of supporting facility 14. Frusto-conical sleeve 18 is fabricated out of a flexible weather-resistant material 26, such as fabric or plastic.

Supporting facility 14 includes a pole 28. Pole 28 is telescopic and contains a plurality of interlocking segments 30 and is fabricated out of a strong weather-resistant material 32, such as aluminum or plastic. Pole 28 includes a stake 34 on a lower end, so that stake 34 can be inserted into the ground 36 with pole 28 in an upright position, as shown in FIG. 2. A spring-loaded sheath 38 is normally over stake 34 when not in use for safety purposes. A clamp 40 is adjacent to the lower end of pole 28, so that clamp 40 can be attached to a stationary object 42, such as a standard golf cart, shown in FIG. 1.

Figure 3:
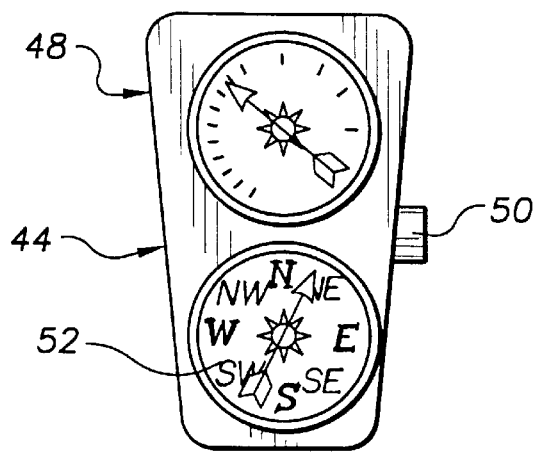
FIG. 3 is a further enlarged elevational view of the wind speed indicator with compass as indicated by arrow 3 in FIG. 2.

The golf wind sock assembly 20, as best seen in FIGS. 2 and 3, further contains an instrument 44 to indicate and measure wind force and speed. Instrument 44 includes a rotating wind speed cup wheel 46 mounted upon top of visually indicating wind direction structure 12. A battery powered wind speed indicator 48 is mounted upon supporting facility 14. Rotating wind speed cup wheel 46 is mechanically connected to battery powered wind speed indicator 48. Battery powered wind speed indicator 48 includes an on/off switch 50 to conserve battery voltage when not in use. Battery powered wind speed indicator 48 also contains a compass 52, to show relative direction the visually indicating wind direction structure 12 is pointing to in relation to magnetic north.

It can be seen from the preceding description that in use, a golfer would simply carry the golf wind sock assembly 10 in a golf bag 54 to the spot from which he will shoot, then clamp it to the golf cart 42 or insert the stake 34 in the ground 36. The golfer will then note the three visual indicators, wind sock unit 16, wind speed indicator 48 and compass 52 to assist in gauging the shot. Use of the golf wind sock assembly 10 will provide a golfer with a very convenient and easy way of accurately determining wind speed and direction. This will give the golfer the highest chance of being able to hit the golf ball in a compensating manner and thereby increase the level of the game.

It is noted that the embodiment of the golf wind sock assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A golf wind sock assembly comprising:

means for visually indicating wind direction; and means for supporting said visually indicating wind direction means in an elevated three hundred and sixty degree rotatable position, so that a person can see what direction wind is blowing from, said supporting means including a pole having a stake on a lower end, so that said stake can be inserted into the ground with said pole in an upright position;

said pole further including a spring-loaded sheath normally over said stake when not in use for safety purposes.

2. The golf wind sock assembly as recited in claim 1, wherein:

said visually indicating wind direction means is a wind sock unit.

3. The golf wind sock assembly as recited in claim 2, wherein:

said wind sock unit includes a frusto-conical sleeve mounted at a right angle through its large opening upon a shaft between two O-rings, in which said shaft is affixed upon top of said supporting means.

4. The golf wind sock assembly as recited in claim 3, wherein:

said frusto-conical sleeve is fabricated out of a flexible weather-resistant material.

5. The golf wind sock assembly as recited in claim 1, wherein:

said pole is telescopic and includes a plurality of interlocking segments.

6. The golf wind sock assembly as recited in claim 1, wherein:

said pole is fabricated out of a strong weather-resistant material.

7. The golf wind sock assembly as recited in claim 1, wherein:

said pole includes a clamp adjacent to a lower end, so that said clamp can be attached to a stationary object.

8. The golf wind sock assembly as recited in claim 1, further comprising:

an instrument to indicate and measure wind force and speed.

9. The golf wind sock assembly as recited in claim 8, wherein:

said instrument includes a rotating wind speed cup wheel mounted upon top of said visually indicating wind direction means.

10. The golf wind sock assembly as recited in claim 9, wherein:

said instrument further includes a battery powered wind speed indicator mounted upon said supporting means, with said rotating wind speed cup wheel mechanically connected to said battery powered wind speed indicator.

11. The golf wind sock assembly as recited in claim 10, wherein:

said battery powered wind speed indicator includes an on/off switch to conserve battery voltage when not in use.

12. The golf wind sock assembly as recited in claim 10, wherein:

said battery powered wind speed indicator includes a compass to show relative direction said visually indicating wind direction means is pointing to in relation to magnetic north.

\* \* \* \* \*